(12) United States Patent
Karstens et al.

(10) Patent No.: US 6,392,035 B1
(45) Date of Patent: May 21, 2002

(54) REACTIVE CELLULOSE AND METHOD FOR MAKING SAME

(75) Inventors: Ties Karstens, Boetzingen; Armin Stein, Kenzingen; Hans Steinmeier, Teningen, all of DE (US)

(73) Assignee: Rhodia Acetow, Freiburg, DE (US)

( * ) Notice: Subject to any disclaimer, the term of this patent is extended or adjusted under 35 U.S.C. 154(b) by 0 days.

(21) Appl. No.: 09/403,713

(22) PCT Filed: Apr. 9, 1998

(86) PCT No.: PCT/EP98/02092

§ 371 Date: Nov. 10, 2000

§ 102(e) Date: Nov. 10, 2000

(87) PCT Pub. No.: WO98/49200

PCT Pub. Date: Nov. 5, 1998

(30) Foreign Application Priority Data

Apr. 25, 1997 (FR) .............................. 97 05430

(51) Int. Cl.⁷ .................. C08B 11/00; C08B 11/02; C08B 16/00

(52) U.S. Cl. .................. 536/84; 536/56; 536/57; 536/94; 536/95; 536/99; 536/100

(58) Field of Search .............................. 536/56, 57, 84, 536/99, 100, 94, 95

(56) References Cited

U.S. PATENT DOCUMENTS

| | | | | |
|---|---|---|---|---|
| 4,136,255 A | * | 1/1979 | Franks | 536/60 |
| 4,399,275 A | | 8/1983 | Sears | 536/70 |
| 4,491,661 A | * | 1/1985 | Bredereck et al. | 536/84 |
| 5,473,061 A | * | 12/1995 | Bredereck et al. | |

FOREIGN PATENT DOCUMENTS

DE          43 29 937          11/1994

* cited by examiner

Primary Examiner—James O. Wilson
Assistant Examiner—Everett White
(74) Attorney, Agent, or Firm—Burns, Doane, Swecker & Mathis, L.L.P.

(57) ABSTRACT

The invention concerns reactive cellulose, i.e. cellulose having in particular a very low degree of crystallinity obtainable with a high degree of purity. Said novel reactive cellulose is particularly used as raw material for making cellulose ethers. The invention is characterized in that the reactive cellulose is substituted by organic groups according to a degree of substitution, DS, of less than 0.2, preferably between 0.04 and 0.2.

20 Claims, 3 Drawing Sheets

REACTIVE CELLULOSE AND METHOD FOR MAKING SAME

Figure 1A:
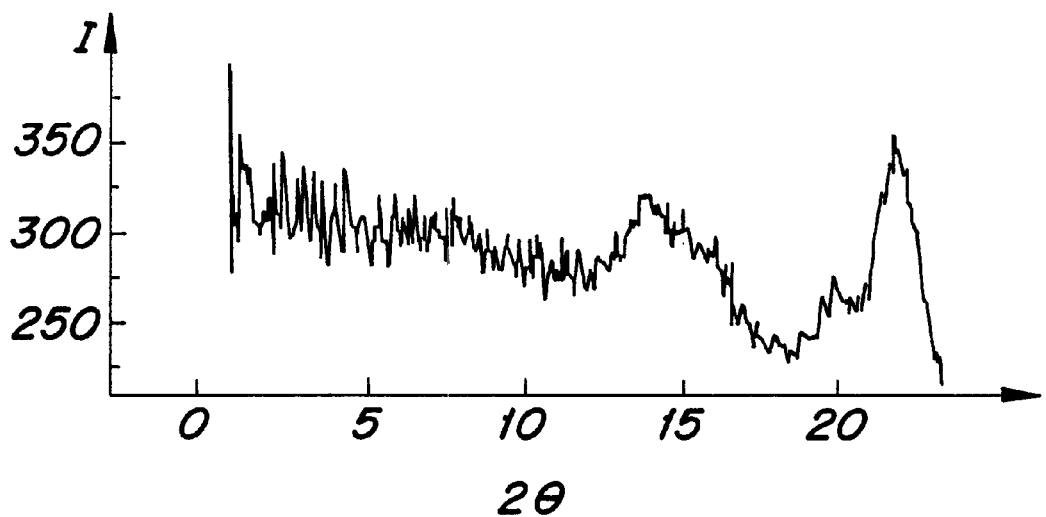

This application is a 371 of PCT/EP98/02092, filed Apr. 9, 1998.

The present invention relates to a modified cellulose with a low degree of substitution, and to a process for manufacturing this cellulose.

The invention relates more particularly to a cellulose containing relatively little substitution, which has improved reactivity and a low degree of crystallization.

Cellulose is a natural polymer present in abundance in nature, in a very wide variety of forms, such as plants (wood, cotton, flax, etc.) or even animals (molluscs, etc.). This natural polymer has been used for a very long time, in particular for the manufacture of paper, textile fibres, plastics or the like.

Modified forms such as cellulose esters or cellulose ethers have also been synthesized. The cellulose ester most commonly used is cellulose acetate, which is used as a plastic material for the manufacture of moulded or extruded articles, in the form of fibres or yarns for the textiles sector or in cigarette filters, for example.

Cellulose ethers are cellulose derivatives which are generally soluble in a solvent such as water or an organic solvent. Cellulose ethers are used in particular as thickeners, agents for controlling the fluidity or viscosity of a medium, and dispersing agents. They can also be used for the formation of colloids or liquid crystals, or as a matrix for the manufacture of films.

Relatively little commercial development of cellulose derivatives with very advantageous properties is performed, with the exception of only a few derivatives such as cellulose acetate or carboxymethyl cellulose.

The reason for this is that cellulose derivatives are obtained by reaction of a compound of substitution on the hydroxyl functions of the cellulose structure. In order to obtain a product which is homogeneous and in particular soluble in solvents, it is necessary to substitute all or most of the hydroxyl groups of the cellulose, and if only some of these groups need to be substituted, the distribution of the substituents should be uniform throughout the cellulose.

However, cellulose has a structure comprising crystalline portions and amorphous portions. Consequently, without treating it beforehand, it is difficult to substitute the hydroxyl groups present in the crystalline portions.

Processes for activating cellulose have been proposed to do this. These processes have the aim of breaking the crystalline regions of cellulose to make them amorphous and accessible to substitution compounds and to make it possible to carry out a substitution of the hydroxyl groups which is total or partial but distributed homogeneously.

Activating agents are generally used simultaneously with the substitution compounds and are solutions of hydroxides such as metal hydroxides, for instance sodium hydroxide, aqueous ammonia, amines, dimethylformamide, dimethyl sulphoxide, acetic acid and quaternary ammonium hydroxides. The activating agent most frequently used is sodium hydroxide, which can also act as a catalyst in etherification reactions.

In order to obtain high activation and thus a dislocation of the crystalline portions which is as complete as possible, large amounts of activating agent are used. Consequently, these processes require steps for purifying the cellulose derivatives which are an economic burden on the preparation processes and which may partially explain the limited industrial and economic development of cellulose derivatives with the exception of a few.

Thus, the discovery of novel processes for manufacturing these derivatives more economically and with a higher degree of purity might allow a cost-effective development of these products.

One of the aims of the present invention is to overcome this problem by proposing a reactive cellulose, i.e. a cellulose having, in particular, a very low degree of crystallinity which can be obtained with a high degree of purity. This novel reactive cellulose is useful in particular as a starting material in the manufacture of cellulose ethers.

To this end, the invention proposes a reactive cellulose substituted with organic groups to a degree of substitution DS of less than 0.2, advantageously between 0.04 and 0.2.

The degree of substitution DS in the cellulose industry is defined as the average number of substituted hydroxyl groups per unit of glucose anhydride. As each glucose anhydride unit comprises three accessible hydroxyl groups, the maximum degree of substitution DS is equal to 3.

According to one preferred characteristic of the invention, the cellulose of the invention has a degree of crystallinity of less than 10%.

Thus, the cellulose of the invention no longer comprising crystalline portions, or only a very small proportion thereof, will make it possible to obtain cellulose derivatives without the need for a concomitant, contaminating activation step. Moreover, the cellulose derivatives obtained using the reactive cellulose of the invention have a better distribution of the substituents in the cellulose, this more homogeneous distribution being reflected by an improved solubility of the cellulose derivatives for a lower degree of substitution.

According to another preferred characteristic of the invention, the organic groups substituted with hydroxyl groups are, in particular, hydrocarbon-based groups which can comprise hetero atoms. Thus, organic groups which may be mentioned are:

linear or branched alkyl radicals comprising from 1 to 6 carbon atoms, aryl, alkylaryl and arylalkyl radicals, alkyl radicals comprising polarizing functions such as a carboxyl, nitrile or hydroxyl function.

Examples of organic groups which may be suitable for the invention are:

methyl, ethyl, propyl, benzyl, hydroxyalkyl, such as hydroxypropyl, hydroxyethyl, carboxymethyl, cyanoethyl, sulphoethyl.

Needless to say, the celluloses of the invention can comprise organic substitution groups of varied nature.

A subject of the invention is also processes for manufacturing the reactive celluloses described above.

These processes consist in treating a cellulose obtained using natural cellulose from plant sources such as wood, cotton, flax, China grass, jute, certain algae, waste from the agrifood industry, or from animal, bacterial, fungal or amoebal sources.

These natural sources of cellulose are treated with concentrated basic solutions to remove the hemicellulose and to recover a cellulose of suitable purity.

According to the invention, the cellulose thus isolated is subjected to an activation step by treatment with an activating agent to make the hydroxyl groups to be substituted accessible, followed by reacting this activated cellulose with at least one substituting agent, such as an etherification or esterification agent, and finally recovering the modified reactive cellulose.

In a first embodiment of the process of the invention, the activated cellulose is subjected to a step of partial removal of the activating agent before mixing it with the substituting agent. Advantageously, the residual weight content of activating agent after this removal step is less than 10%.

This removal is carried out either by washing or by evaporating the activating agent, or by entrainment, for example by washing with a solvent for the activating agent, in which the cellulose is insoluble.

This step for removing the activating agent makes it possible, particularly when the activating agent is an alkaline solution, to remove a large proportion of this agent and give an amorphous cellulose which is not contaminated with the said agent.

The activation can be carried out with pure liquid ammonia placed in contact with the cellulose to be activated, under high pressure and temperature, followed by activation of the cellulose either by abrupt pressure reduction in the closed chamber containing the ammonia/cellulose mixture, or by extraction or suction of the ammonia-impregnated cellulose and abrupt depressurization of the said cellulose. These two activation processes are described, respectively, in patent applications DE 19511061 and WO 96/30411.

The removal of the ammonia in the activated cellulose is advantageously carried out by evaporation to give a residual $NH_3$ content of less than 2%.

This activation can also be carried out by treating the cellulose with an alkaline solution such as sodium hydroxide according to a process known as "mercerization".

After activation, the cellulose is washed with a solvent for the sodium hydroxide such as methanol or ethanol, to give a weight concentration of sodium hydroxide of less than 10%, advantageously between 2% and 10%.

These activated celluloses with a depleted content of activating agent are subjected to a substitution reaction by adding a substituting agent, according to operating conditions which vary depending on the nature of the substituting agent.

Generally, the amount of substituting agent added corresponds to the stoichiometric amount required to obtain the desired degree of substitution (DS), and advantageously corresponds to a molar excess of less than 150% relative to the said stoichiometric amount.

This reaction can be carried out in the presence or absence of a catalyst. Thus, conventional esterification catalysts will be used in the esterification reactions.

The substituting agents are compounds comprising the organic substitution group defined above, and a function which reacts with hydroxyl groups. As reactive functions which are useful, mention may be made, for example, of carboxylic, acid anhydride, acid halide, epoxy, isocyanate and halogen functions, and activated ethylenic bonds such as acrylonitrile or vinylsulphonate functions. Carbon sulphide $CS_2$ can also be used as a substituting agent, and leads to a cellulose xanthate. As substituting agents which are suitable for the invention, mention may be made of:

acetic anhydride (cellulose acetate),
formic acid (cellulose formate),
sodium chloroacetate (carboxymethyl cellulose),
ethylene oxide (hydroxyethylcellulose),
propylene oxide (hydroxypropylcellulose),
alkyl halide (alkyl cellulose),
benzyl halide (benzyl cellulose),
acrylonitrile (cyanoethylcellulose),
urea (cellulose carbamate),
sodium chloroethanesulphonate (sulphoethylcellulose).

In the variant of activating cellulose with ammonia, a treatment of the activated cellulose with a stoichiometric amount of sodium hydroxide corresponding to the desired degree of substitution DS is carried out prior to the reaction with the substituting agent, when the latter comprises a halide radical in the function which is to react with the hydroxyl groups.

Advantageously, the substituted cellulose obtained after reaction with a substituting agent can be subjected to a purification step such as, for example, a step of washing with water. This step is not obligatory and is carried out only if it is necessary in order to obtain the desired degree of purity.

Thus, this purification step will often be unnecessary when the cellulose activated with ammonia is reacted directly with a substituting agent.

In a second embodiment of the process for manufacturing the reactive celluloses of the invention, the substituting agent is added to the ammonia before the activation step.

This embodiment is suitable for substituting agents which are soluble in pure liquid ammonia or dispersible in pure liquid ammonia.

In addition, this substituting agent must be chemically inert with respect to ammonia.

As a substituting agent which is suitable for this second embodiment of the process of the invention, mention may be made, in addition to the substituting agents already listed, of oxazoline, for example.

The use of these celluloses with a low degree of crystallinity is not limited to the use described above, but can also comprise a use as a polymer matrix for the manufacture of compositions intended to be shaped by conventional moulding techniques such as injection or extrusion.

Figure 1B:
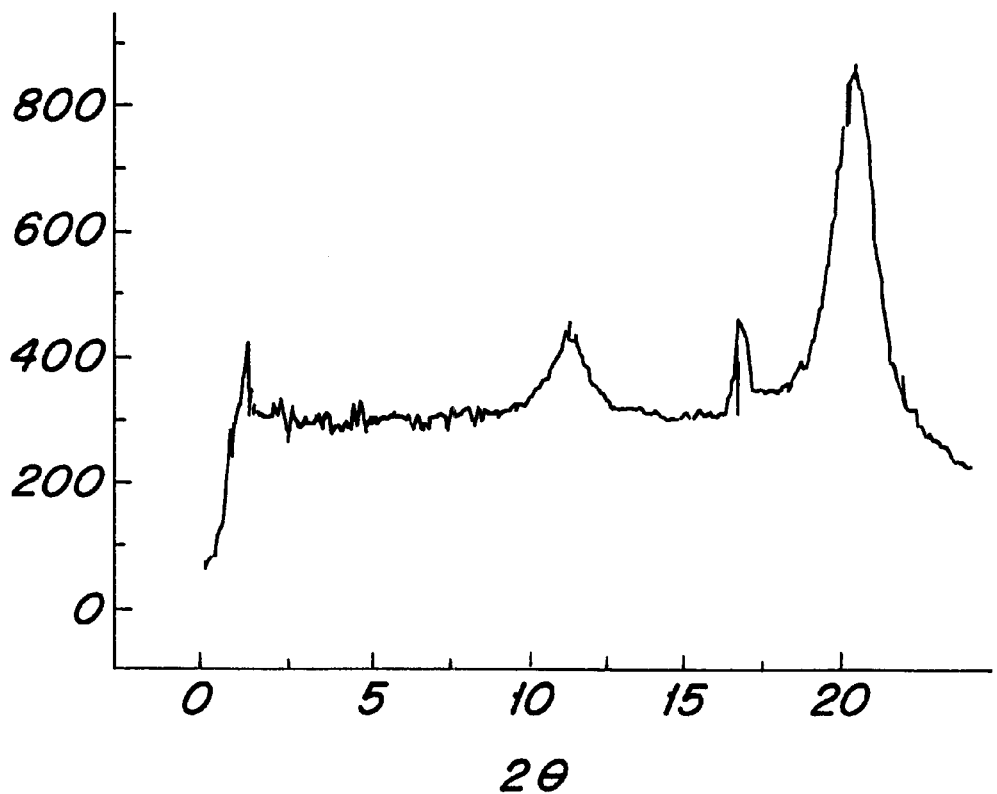
Figure 1C:
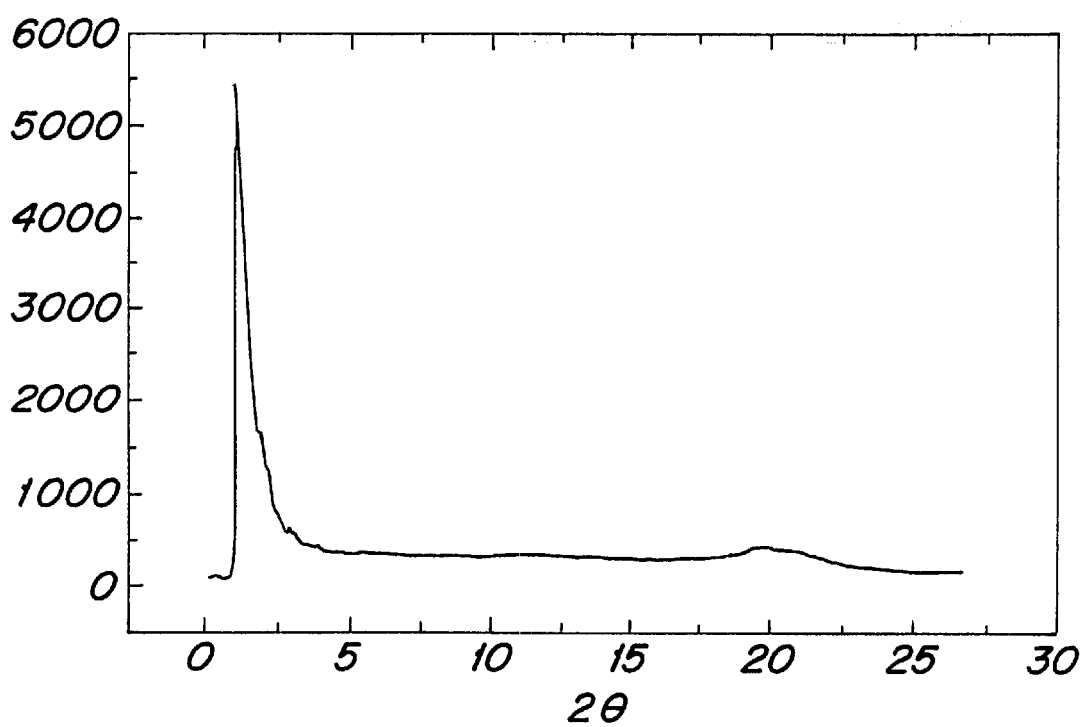
Figure 2:
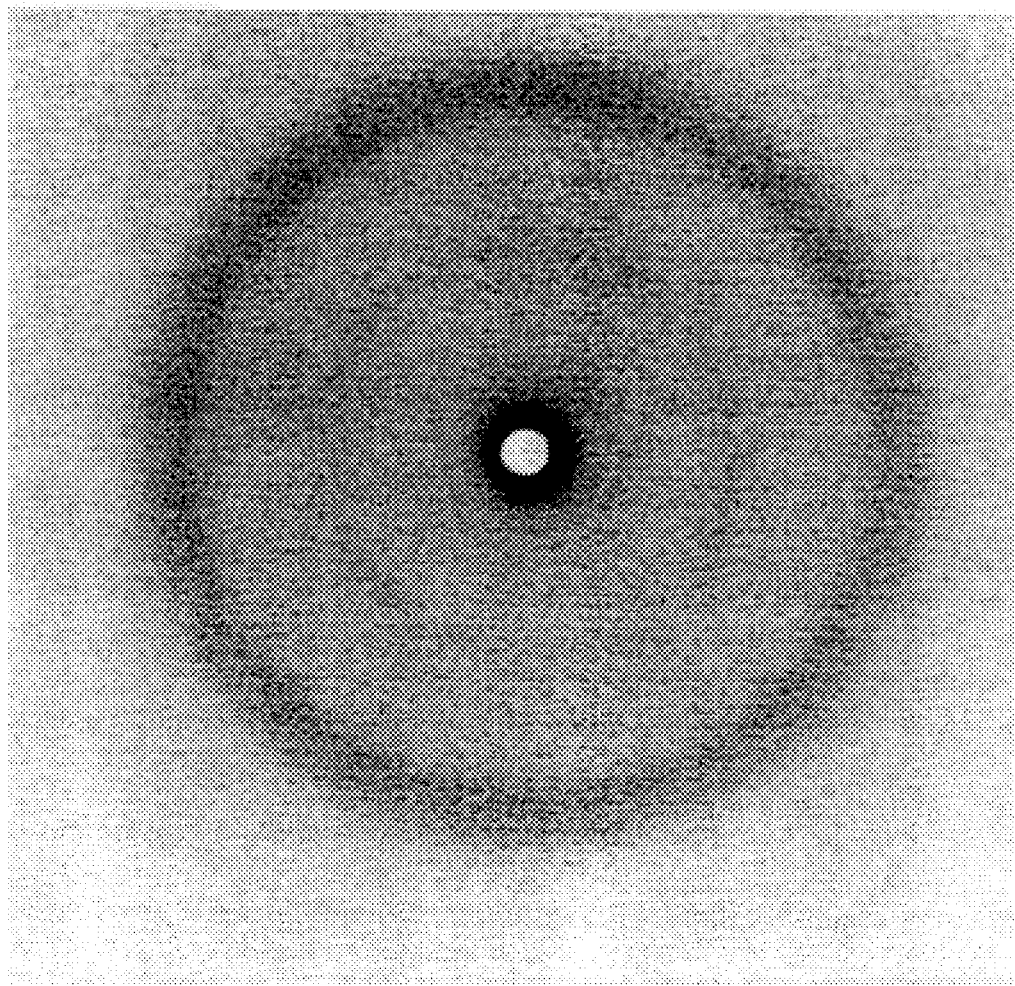

Other aims, advantages and details of the invention will emerge more clearly in the light of the examples below, given purely for illustrative purposes and without any limiting nature, and the attached figures in which:

FIGS. 1a, 1b and 1c represent the X-ray diffraction diagrams of, respectively, an untreated cellulose, a cellulose activated by explosion with ammonia and a benzyl cellulose in accordance with the invention, and FIG. 2 represents an X-ray diffraction image obtained with the benzyl cellulose of Example 5.

The examples below describe the preparation of various reactive celluloses with a low degree of crystallinity according to the different manufacturing process variants of the invention, and different organic substitution groups.

The reactivity of the celluloses in accordance with the invention is demonstrated by means of tests of reacting this cellulose with given substituting agents, for instance a silylating agent such as HMDZ.

These tests are performed according to the following procedures:

Silylation test: The reactivity of the cellulose derivatives is monitored by mixing 0.5 g of the derivative to be treated with 10 ml of hexamethylene disilazane and 1 ml of N-methylpyrrolidone (NMP). An active amount (100 mg) of ammonium chloride is added. The mixture is heated to 80° C. with stirring. The reaction mass swells slowly to give a viscous mass which prevents any stirring, this state indicating the end of the silylation reaction. However, the reaction is interrupted after a period of 4.5 hours if stirring is still possible. The reactivity is determined by observing the appearance of the solution before stopping the reaction and changes to become more reactive (+/−: less reactive; +++: more reactive):

+/−: from 10 to 50% of the fibres are in the swollen state
+: less than 10% of the fibres are in the swollen state
++: solution showing turbidity +++: clear solution
( ): reaction time if stopped before 4.5 hours The reactivity of the celluloses in accordance with the invention is generally compared with that of an unmodified cellulose used in the conventional silylation processes.

EXAMPLE 1
Preparation of a Cellulose Activated with Ammonia 800 g of commercial chemical cellulose in leaf form containing about 96% of alpha-cellulose and about 8% by weight of water are cut into pieces 1.3×1.3 cm in size.

These pieces are placed in a jacketed autoclave. Liquid ammonia under pressure is introduced into the autoclave via a valve.

The system is heated to 70° C. The pressure in the autoclave is about 20 bar.

The system is maintained under these conditions for 60 seconds.

The cellulose is then transferred into an explosion reactor via a valve. As soon as the valve is opened, the ammonia pressure in the cellulose falls rapidly, bringing about a kind of explosion and defibrillation of the cellulose.

The ammonia concentration in the cellulose is lowered to a value of less than 0.2% by weight relative to the cellulose by applying a reduced pressure.

EXAMPLES 2 TO 6
Preparation of a Benzyl Cellulose

The benzyl cellulose is obtained by reacting benzyl chloride with cellulose.

According to one embodiment of the process of the invention, the cellulose activated with ammonia, obtained in Example 1 and having a residual weight concentration of ammonia represented by $[NH_3]$, is dispersed in a sodium hydroxide solution with a weight concentration represented by $[Na]_{aq}$ (400 ml of sodium hydroxide solution per 10 g of cellulose).

The reaction medium is maintained at 20–25° C. for 1 h.

The modified cellulose is washed with ethanol after centrifugal filtration to remove the sodium hydroxide. The weight concentration of residual sodium hydroxide (NaOH) in 100 g of cellulose, expressed as a percentage, is represented by $[OH^-]$ in Table I below.

The activated and centrifugally filtered cellulose is added as a suspension in an organic solvent (N-methylpyrrolidone) containing benzyltrimethylammonium chloride, the weight concentration of which is represented by $[R_4N]$. The solution is placed under a reduced pressure of 20 mbar at 40° C. to bring about removal of the alcohol.

After re-establishing atmospheric pressure, a solution of benzyl chloride in N-methylpyrrolidone is added to the reaction medium maintained under vigorous stirring.

After reaction for 1 hour at 40° C., the cellulose obtained is filtered off and washed with water until a pH in the region of 7 is obtained for the washing waters.

The reactive cellulose is then dried at 80° C. under a reduced pressure of 1 mm Hg.

Silylation tests are carried out in order to check the reactivity of the modified cellulose.

The proportions and concentrations of each reagent and the results of the tests are collated in the table below.

The degree of substitution (DS) is determined by infrared analysis.

TABLE I

| | Activation of the cellulose | | | Benzylation | | | Results | |
|---|---|---|---|---|---|---|---|---|
| Ex. | Activation with $NH_3$ | $[NH_3]$ % | $[Na]_{aq}$ % | Degree of swelling % | $[OH^-]$ % | $[R_4N]$ % | Molar ratio RX/cell. | DS | Silylation |
| 2 | yes | 0.46 | 14 | 347 | 28.9 | 4.2 | 0.9:1 | 0.12 | +++ |
| 3 | yes | 0.015 | 6 | 336 | 15.5 | 3.9 | 1:1 | <0.1 | +++ |
| 4 | yes | 3.05 | 2 | 310 | — | 3.9 | 2:1 | <0.1 | ++ |
| 5 | yes | 1.2 | 4 | 425 | 55 | 3.9 | 2:1 | 0.08 | +++ |
| 6 | yes | 1.55 | 1 | 240 | 1.7 | 4.0 | 2:1 | <0.1 | + |

The attached FIG. 1 represents the X-ray diffraction graphs of the untreated cellulose (FIG. 1a), of the cellulose activated by explosion with ammonia as described in Example 1 (FIG. 1b) and of the benzyl cellulose of Example 5. These figures clearly show the totally amorphous nature of the benzyl cellulose whose degree of substitution is very low. FIG. 2 illustrates the X-ray diffraction spectrum obtained with the compound of Example 5.

EXAMPLES 7 TO 20C
Preparation of a Cyanoethylcellulose

Cyanoethylcellulose is obtained by reacting acrylonitrile with cellulose.

This compound is obtained according to the following procedure:

Activated cellulose of Example 1 is dispersed in a basic sodium hydroxide or aqueous ammonia solution. This mixture is maintained at 5° C. for one hour and is then stirred for 15 to 30 minutes.

Given amounts of acrylonitrile are then added to the mixture in order to obtain a given acrylonitrile/glucose anhydride unit molar ratio ($Ac/R_{cell}$)

After stirring, the reaction medium is maintained at 45° C. for 1.5 to 3 hours and then stored at low temperature (about 0° C.) for about 2 hours.

The medium is neutralized with acetic acid.

The modified cellulose is recovered by filtration and washed with water and alcohol.

The cellulose is then dried under vacuum at 80° C. Its reactivity is checked by the silylation test described above.

The various molar ratios and the results of the reactivity tests are collated in Table II below.

TABLE II

| Ex. | Activation with NH$_3$ | [NH$_3$] % weight | Solvent | Molar ratio Rcell./solvent | Molar ratio ACN/Rcell | DS | Silylation |
|---|---|---|---|---|---|---|---|
| 7 | yes | 0.13 | NaOH-2% | 1:27 | 1:1 | 0.063 | ++(2.5) |
| 8 | yes | ~ | NaOH-2% | 1:25 | 2:1 | 0.105 | +++ |
| 9 | yes | 0.05 | NaOH-1% | 1:25 | 0.2:1 | 0.024 | ++(1.5) |
| 10 | yes | ~ | NaOH-1% | 1:39 | 4:1 | 0.18 | +++ |
| 11 | yes | 0.1 | NaOH-0.5% | 1:25 | 2:1 | 0.139 | ++ |
| 12 | yes | 0.1 | NaOH-0.25% | 1:23 | 2:1 | 0.03 | +++ |
| 13 | yes | 1 | NaOH-0.5% | 1:20 | 2:1 | 0.066 | + |
| 14 | yes | ~ | NaOH-5% | 1:17 | 4:1 | 0.0046 | ++ |
| 15 | yes | 8.1 | H$_2$O | 1:20 | 2:1 | <0.0035 | ++ |
| 16 | yes | (1) | NaOH-0.5% | 1:10 | 2:1 | 0.284 | +++ |
| 17 | yes | (1) | NaOH-0.5% | 1:10 | 1:1 | 0.07 | +++ |
| 18 | yes | (1) | NaOH-0.5% | 1:10 | 0.5:1 | 0.02 | +++ |
| 19* | yes | ~ | — | — | ~1:1 | | ++ |
| 20C | yes | — | NaOH-2% | 1:40 | 2:1 | 0.086 | + |

(1) the cellulose was used directly after activation with ammonia without pretreatment with an alkaline solution
*the acrylonitrile was mixed with the cellulose before explosion by dissolving the acrylonitrile in liquid ammonia
~negligible ammonia concentration

EXAMPLES 21 AND 22
Preparation of Cellulose Benzoate

In a similar manner, cellulose activated with ammonia, prepared according to Example 1, is mixed with a sodium hydroxide solution for 1 hour at 20–25° C.

After centrifugal filtration to remove the excess sodium hydroxide, the activated cellulose is mixed with a solvent (NMP) to allow exchange between the solvent and the water. The mixture is stored for 12 hours. The cellulose is again pressed to remove the contaminated NMP solvent. The cellulose is dissolved in a pure NMP solvent.

After cooling to 15° C., a benzyltrimethylammonium chloride salt is added.

Benzoyl chloride dissolved in N-methylpyrrolidone is added to the reaction medium.

The reaction medium is maintained at 50° C. for 3 hours. It is then cooled to room temperature and stored for 12 hours.

The polymer obtained is filtered and washed with water and then with ethanol, after which it is dried under vacuum at 80° C.

The reactivity of the substituted cellulose is checked by the silylation test described above.

The concentrations of the various reagents and the results of the silylation test are given in Table III below:

TABLE III negligible ammonia concentration

| Ex. | Activation with NH$_3$ | [NH$_3$] % | [Na]$_{aq}$ % | [R$_4$N] | [OH$^-$] | Molar ratio RX/cell. | Silylation |
|---|---|---|---|---|---|---|---|
| 21 | yes | 7.7 | — | 3.3 | — | 1:1 | ++(1.5) |
| 22 | yes | ~ | 1 | 3.0 | 2.4 | 1:1 | +++(1) |

EXAMPLE 23
Preparation of Cellulose Formate

An amount of 10 g of activated cellulose according to Example 1, which has a residual NH$_3$ content of less than 0.2% by weight relative to the cellulose, is washed with methanol (twice 200 ml) and centrifuge-filtered. The methanol content is not critical for the subsequent step, treatment with formic acid.

For this treatment, 200 ml of formic acid (technical grade, 98%) are added to a 500 ml flask with the above activated cellulose. The mixture is left at room temperature with stirring for 4 hours. The formic acid is then separated from the cellulose formate by filtration. After washing and centrifugal filtration with methanol, and water, the product is dried under vacuum. The DS (formate) determination is carried out by alkaline hydrolysis (NaOH) and titration of the excess sodium hydroxide. The degree of substitution DS was equal to 0.2.

The cellulose formate obtained according to the process described is stable in boiling water. It degrades at and above a pH~9. Solutions of the cellulose formate in dimethylacetamide solvent at concentrations of 10% can be prepared.

What is claimed is:

1. Cellulose having a degree of substitution (DS) of the hydroxyl groups with organic radicals of less than 0.2 and a degree of crystallinity of less than 10%.

2. Cellulose according to claim 1, wherein the organic radicals are residues of organic compounds comprising hydrocarbon-based radicals which can contain hetero atoms.

3. Cellulose according to claim 2, wherein the organic radical comprises linear or branched alkyl radicals comprising from 1 to 6 carbon atoms, aryl, alkylaryl and arylalkyl radicals, or alkyl radicals comprising polarizing functions.

4. Cellulose according to claim 3, wherein the organic radical comprises methyl, ethyl, propyl, benzyl, carboxymethyl, cyanoethyl or sulphoethyl groups or hydroxyalkyl groups.

5. Process for manufacturing a cellulose according to claim 1, comprising:
   activating a cellulose pulp by treatment with an activating agent,
   partially removing said activating agent in order to obtain a residual content of activating agent of less than 10% by weight in an activated cellulose,
   reacting said activated cellulose with an organic substitution compound, and
   optionally, removing the rest of the activating agent and the side products of the substitution reaction.

6. Process according to claim 5, wherein the organic substitution compound is added in a stoichiometric ratio relative to the hydroxyl groups of the cellulose which are to be substituted.

7. Process according to claim 6, wherein the organic substitution compound is added in a molar excess of less than 150% relative to said stoichiometric amount.

8. Process according claim 5, wherein the organic substitution compound comprises a hydrocarbon-based radical which can comprise hetero atoms or a function which reacts with the hydroxyl groups of cellulose, or carbon sulphide.

9. Process according to claim 8, wherein the function which reacts with the hydroxyl groups comprises carboxyl, acid anhydride, acid halide, epoxy, isocyanate or halogen functions or an activated ethylenic bond.

10. Process according to claim 8, wherein the organic substitution compound comprises acetic anhydride, sodium chloroacetate, ethylene oxide, propylene oxide, alkyl or benzyl halides, acrylonitrile, urea or sodium chloroethanesulphonate.

11. Process according to claim 5, wherein the activating agent comprises alkaline hydroxides or ammonia.

12. Process according to claim 11, wherein the alkaline hydroxide activating agents are sodium hydroxide or aqueous ammonia.

13. Process according to claim 11, wherein the activating agent is pure liquid ammonia, the cellulose being treated under pressure with ammonia in a confined chamber and then subjected to an abrupt decrease in ammonia pressure in said chamber.

14. Process according to claim 13, wherein the cellulose activated with ammonia is reacted with a substitution compound comprising isocyanate compounds, urea, compounds comprising a nitrile function or compounds comprising an activated ethylenic bond.

15. Process according to claim 14, wherein the substitution compound is placed in contact with the cellulose prior to the activation step.

16. Process according to claim 14, wherein the activating compound is dissolved or dispersed in liquid ammonia.

17. Process according to claim 13, wherein the cellulose activated with ammonia is treated with an amount of hydroxide equal to the stoichiometric amount of the hydroxyl groups of the cellulose to be substituted in order to obtain the desired degree of substitution (DS); the cellulose treated with hydroxide is then reacted with a substitution compound comprising alkyl halides, carbon sulphide or organic compounds comprising polarized double bonds, the product obtained optionally being washed to remove the hydroxide residues.

18. Process according to claim 17, wherein the hydroxide is sodium hydroxide.

19. Process according to claim 11, wherein the activating agent is pure liquid ammonia, the cellulose being treated under pressure with ammonia in a confined chamber and then extracted from said chamber and subjected to an abrupt decrease in pressure.

20. Process according to claim 5, wherein the cellulose is subjected to a step of mercerization with a hydroxide and then to washing with a solvent for sodium hydroxide in order to obtain a hydroxide concentration of less than 10% by weight, said treated cellulose is then reacted with a substitution compound comprising alkyl halides, carbon sulphide or organic compounds comprising at least one polarized unsaturated bond, the substituted cellulose being subjected to washing in order to remove the residual hydroxide and the excess reaction products.

* * * * *